Nov. 21, 1967    OLE-BENDT RASMUSSEN    3,354,253
METHOD AND APPARATUS FOR STRETCHING THERMOPLASTIC FILM
Filed Sept. 28, 1964    2 Sheets-Sheet 1

INVENTOR.
OLE-BENDT RASMUSSEN
BY
*Young & Quigg*
ATTORNEYS

United States Patent Office

3,354,253
Patented Nov. 21, 1967

3,354,253
METHOD AND APPARATUS FOR STRETCHING THERMOPLASTIC FILM
Ole-Bendt Rasmussen, Copenhagen, Denmark, assignor to Phillips Petroleum Company, a corporation of Delaware
Filed Sept. 28, 1964, Ser. No. 399,794
Claims priority, application Great Britain, Oct. 7, 1963, 39,486/63
10 Claims. (Cl. 264—288)

The present invention relates to a method and apparatus for stretching thermoplastic film in a nonlongitudinal direction. In another aspect it relates to a method and apparatus for extending the width of a film which has before-hand been oriented obliquely.

Oblique-oriented films are valuable in the manufacture of composite sheet materials known under the names cross-plastic or cross-laminates. These contain two or more strongly oriented films, united in a laminate, usually by means of a pressure-sensitive adhesive. In each of the plies of the laminate the orientation is substantially uniaxial, and the axes of orientation in adjacent layers cross each other. The special advantage of these materials is a favorable combination of tear-propagation resistance and tensile strength. The laminates are especially for heavy duty bags, tarpaulins and similar purposes.

Among the common and cheap thermoplastic substances, high density polyethylene and isotactic polypropylene are most suited for the manufacture of cross-plastic. In order to obtain the best characteristics of strength, the orientation can be carried out at a relatively low temperature, for example, in the case of high density polyethylene or polypropylene, at room temperature or only slightly elevated temperature. Under these conditions the said polymers can be oriented lengthwise, whereas lateral stretching which is more critical has not worked successfully.

In order to obtain a continuous cross lamination based on lengthwise stretching, following a known method, a tubular film is stretched and subsequently cut in a spiral. The tube is thereby transformed into a band in which the direction of orientation is oblique. Two or several such obliquely oriented bands are finally continuously laminated on a pair of rollers, the directions of orientation of adjacent bands crossing each other. A longitudinally oriented band can also be included in the "sandwich."

The spiral-cutting is carried out in a way that either the knife or the tubular film is rotated around the center axis of the latter while the film advances. In the case of rotating the knife, a bobbin to take up the obliquely oriented band must be rotated around the same axis in synchronization with the knife so as to perform a planetary movement. In the case of rotating the tubular film, a bobbin from which the film is taken, or preferably the whole stretching unit, must be rotated.

As the difficulties in making tubular film increase considerably with increasing diameter, and as there furthermore are complications in rotating large masses, it is seen that there is an advantage in extending the width of the band subsequent to the spiral-cutting, provided this can be done with relatively simple means and without reducing the favorable properties of strength which have been introduced by the lengthwise stretching carried out at relatively low temperature. It shall now be explained how there will be obtained, in addition to the increase of width obtained directly by non-longitudinal stretching, an indirectly obtained increase of width in case the said stretching can take place with simultaneous change of the angle of orientation towards a value which is closer to lateral orientation.

In the production of a 2-ply laminate the speeds of advancement and rotation of the tubular film are normally adapted to each other in such way that a 45° orientation is formed. In the production of two of the layers for a 3-ply laminate, the speeds are usually adapted to give 60° orientation, while the third layer is oriented longitudinally. As can be demonstrated geometrically, the width ($b$) of the band which is turned out by the spiral-cutting relates to the width ($h$) of the flat-layed length-oriented tube, and the angle of cutting ($\alpha$) according to the following equation:

$$b = 2h \cos \alpha$$

From this it is seen that
If $\alpha = 60°$, then $b = h$
If $\alpha = 45°$, then $b = h\sqrt{2} = 1.4 \times h$
If $\alpha = 30°$, then $b = h\sqrt{3} = 1.7 \times h$ When the need is for an angle of orientation of about 45° or closer to the lateral direction, it is seen from the equation and examples given above that there is an advantage in making the spiral-cutting follow a lower angle, as for instance about 30°, and subsequently increasing the angle of orientation by a shear action.

The band thereby obtained is wider than would be a band which is cut from the tube at a greater angle in order to obtain directly the higher angle of orientation.

The method according to the present invention comprises the steps of continuously bringing the film to be stretched in engagement with a set of continuously advanced transverse holding means, said holding means preferably consisting of two series of parallel rods or the like, one series for each side of the said film, the directions of each of said rods forming at the beginning of the engagement an angle substantially below 90° (e.g. 45°) to the direction of its advancement, during the said advancement keeping all rods which are in engagement with the film substantially parallel and closely spaced to each other, and continuously changing the direction of advancement so as gradually to increase the angle between each of the rods and its direction of advancement, and finally, preferably when the said angle has reached a value of about 90°, continuously disengaging the film from the said holding means.

The stretching apparatus accordingly comprises two sets of holding means shaped as rods, sticks or the like and disposed to engage a continuous film transversally, means for introducing in an endless process said rods to the zone of said engagement, means for holding said rods in the position of engagement, means for continuously advancing the rods in the said zone of engagement while keeping them parallel and closely spaced from each other, means for simultaneously moving the rods along their axis in order to continuously change their resultant direction of advancement as seen in relation to the fixed direction of the rods from a value substantially below 90° (e.g. 45°) to a higher value, preferably to about 90°, and means for bringing the rods out of the position of engagement to be used in the said endless process again.

The spacings between the transverse rods are preferably progressively increased during the stretching process in order to keep a firm hold on the film. The two sets of rods can be connected at both ends thereof to form two endless chains, or the rods can be stacked in one or two magazines from which they are one by one or two by two taken to the place where the processing begins, and to which they are successively taken back when they have passed through the zone of processing.

The method and apparatus described above is highly suited for making obliquely-oriented films wider and at the same time increasing their angle of orientation.

It is an object of this invention to provide a method and apparatus for continuously stretching thermoplastic film in a nonlongitudinal direction.

Another object is to provide a method of stretching an obliquely-oriented film so as to increase its width and change its direction of orientation.

Still another object is to provide a method of making relatively wide, obliquely-oriented bands of thermoplastic film that can be joined together in a cross-laminate.

Other objects, advantages and features of this invention will be apparent to those skilled in the art from the following description and drawing in which.

Figure 1:
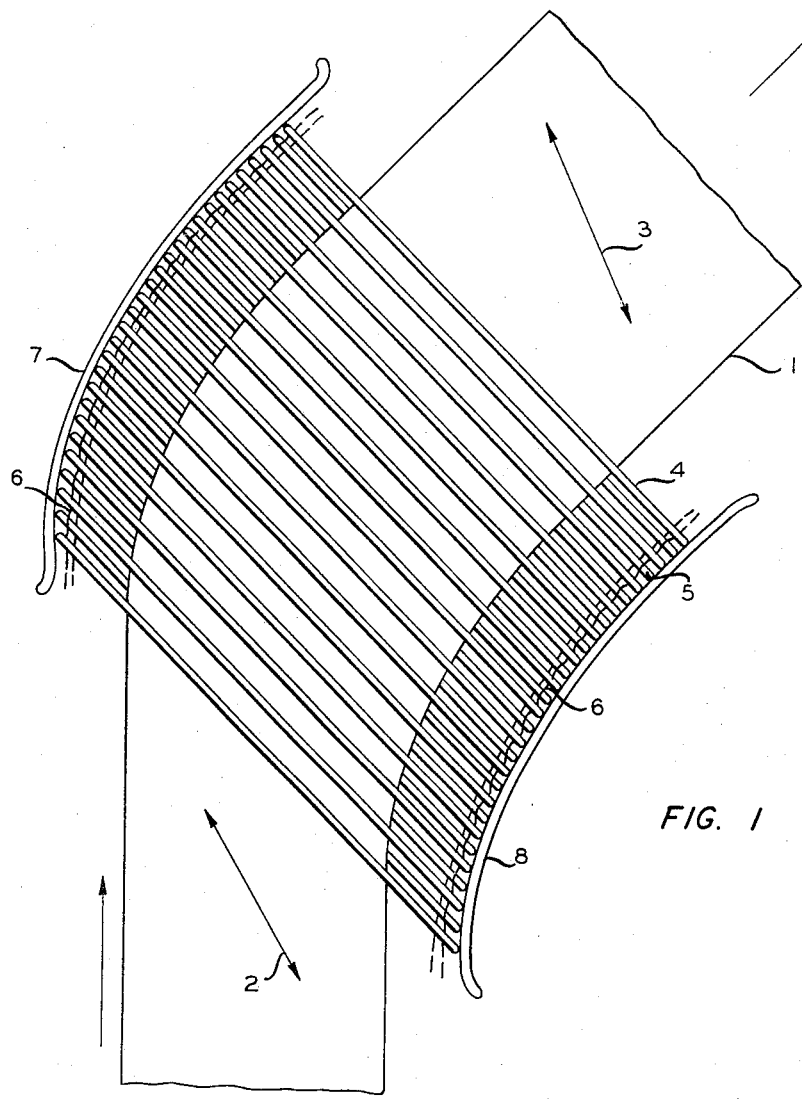
FIGURE 1 is a partial plan view of the apparatus of the invention showing only those holding rods in engagement with the film.

The construction and function of the apparatus will further appear from the drawing. FIGURE 1 shows the stretching schematically, leaving out the means for holding the rods in engagement with the film, holding the same at the fixed angle, and supplying that component of advancement which is perpendicular to the rods. The view is horizontal although the curvature may give a false impression of perspective.

Figure 2:
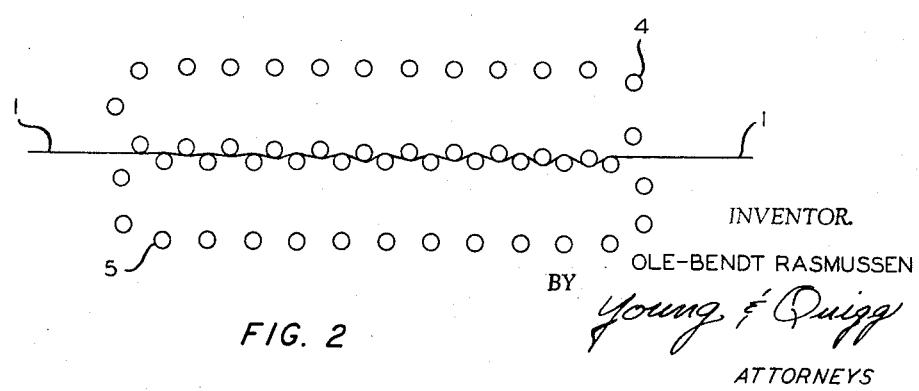
FIGURE 2 is a partial, center sectional view of the rods and film showing the zone of engagement and path of return for the rods in an endless loop.

In FIGURES 1 and 2 a film 1 is advanced continuously through the stretching apparatus. Film 1 has been formed by lengthwise orienting a tube which was subsequently cut spirally to form film having oblique orientation. The direction of this orientation, indicated by arrow 2, can with advantage be about 30°, and the process to be described now increases by shear action the said angle to 45–60° (shown by arrow 3) and simultaneously increases the width of film 1. To this end the film 1 is gripped by the two sets of transverse parallel rods (4 and 5, respectively) which by means of wire connections form two endless chains. (Only the wires 6 of the one of the sets of rods are shown.)

It should be understood that there are provided means for advancing the two sets of rods and keeping the latter in proper position. The rods must be kept parallel during the course of the shear action and also be kept in a position for holding the film. The simple manner of gripping the film shown in FIGURE 2 is sufficient when the film is steadily under tension, and this is provided for by gradually increasing the engagement of the two sets of rods. The latter may alternatively be nipped together in order to hold the film still more firmly, but this arrangement is more complicated.

The apparatus also includes means for advancing the rods, not shown in FIGURE 1. Guiding tracks 7 and 8 provide for the shear action which takes place as the rods advance.

When the initial angle between the rods and their direction of advancement is 45° and the corresponding terminal angle is 90°, as shown in FIGURE 1, the increase by width takes place at a ratio of $\sqrt{2}$:1, i.e. by about 40%. The increase of the angle of orientation can, however, not be indicated in a simple way as this depends upon the degree of engagement between the rods.

Figure 3:
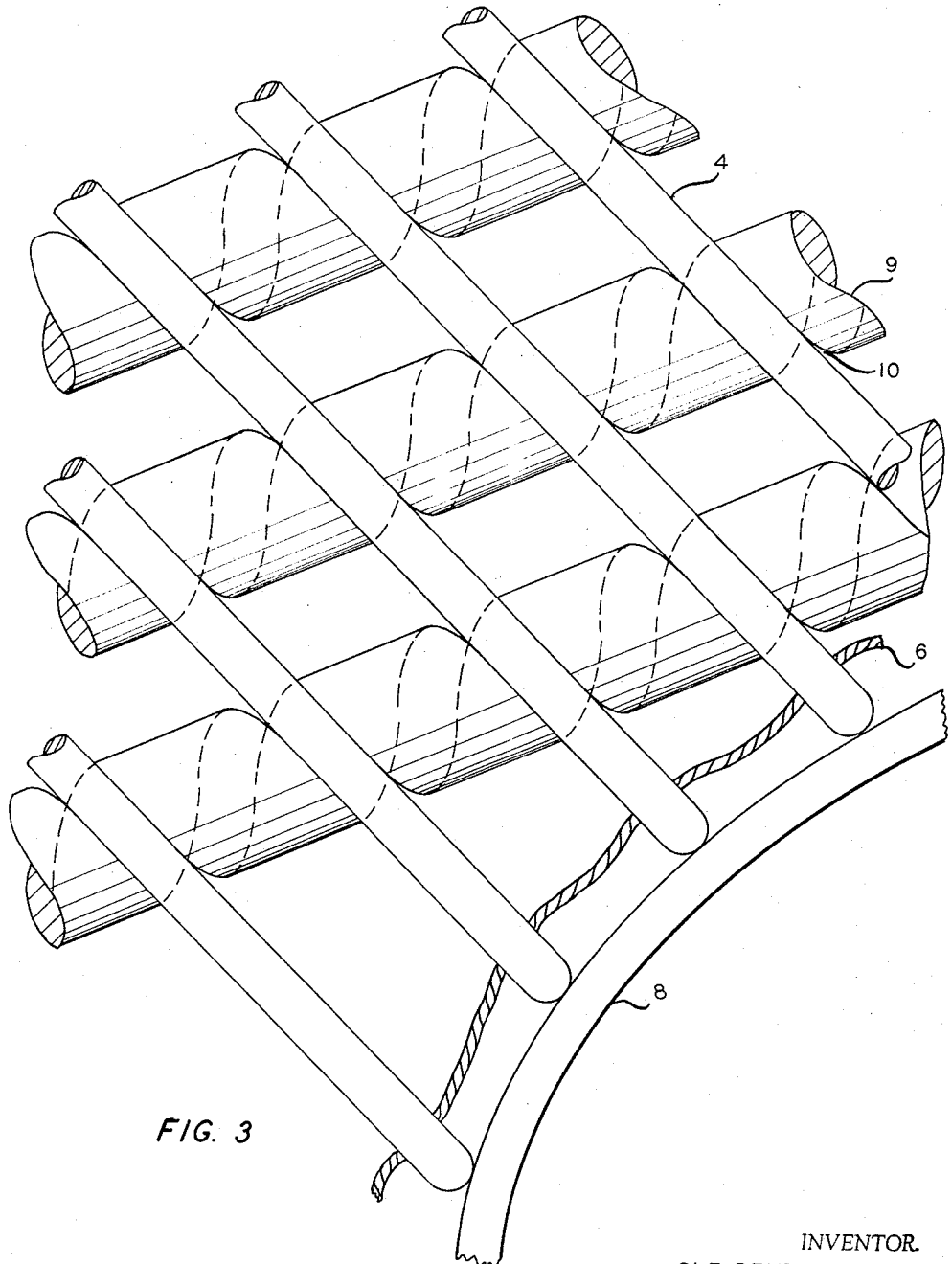
FIGURE 3 is a partial view in detail showing one end of the rods in relation to the guide and advancing means not shown in FIGURES 1 and 2.

FIGURE 3 shows the rod advancing means which provides a backing support for the rods, means for advancing the latter while keeping them parallel, and bearings for their longitudinal movement controlled by guide tracks 7 and 8. This advancing means comprises a series of rotating screws 9 having grooves 10 shaped so as to fit the rods. There is preferably used a multitude of the said screws equally distributed over the entire area of stretching, synchronized in their rotation and supplied with axial bearings which are fixed in relation to the base of the apparatus.

By virtue of this simple arrangement it is possible to use rods having a rather small diameter, e.g. about 10–20 mm., while making their spacing especially low, e.g. 2–10 mm. When only very narrow strips of the film are not in direct contact with the rods making the shear action, even materials such as high density polyethylene or isotactic polypropylene can readily be processed at room temperature or only slightly elevated temperature. In this manner the favorable characteristics of strength produced by the previous lengthwise stretching at a similar temperature are not reduced substantially. The grip of the rods on the film can, however, result in a lateral striation which indicates some inhomogeneity of the orientation, but this can be removed after the shearwise drawing by a slight continuous lengthwise drawing carried out by means of the usual sets of rollers.

In order to increase the width and the angle of orientation more than is obtainable in one process as described, the same can be repeated once or twice more. In this case it will, however, normally be advantageous to use a relatively low stretching ratio, e.g. about 2:1, during this first stretching which is carried out lengthwise, instead of a ratio of 4:1 or at 5:1, which is normally used in the lengthwise stretching for production of cross-laminates.

As an example of practicing the method of this invention, a tube of polyethylene having a density of about 0.96 gram per cubic centimeter, the tube having a lay-flat width of 3 feet and film thickness of 2 mils, is stretched lengthwise at room temperature, e.g. about 80° F., with a draw ratio of 4:1. The longitudinally-oriented tube is then cut spirally at an angle of 30° to form a continuous band in which the direction of orientation is at an angle of 30° to the lengthwise dimension of the band.

This obliquely-oriented band of polyethylene film is then passed lengthwise at room temperature into the apparatus of this invention so that the rods engage the film at an angle of 45° to the length thereof while traveling at initial engagement parallel to the movement of the film. The film is held taut by feed and take-up reels while the rods gradually increase their extent of engagement. The rods have a diameter of 15 mm. and are spaced 5 mm. apart. As the rods progress in the zone of engagement they are gradually shifted axially so as to change their path and the path of the film from the initial direction to a direction in which the rods form an angle of about 90° to the lengthwise dimension of the film. The film is withdrawn from the apparatus with a width 40 percent greater than before entering the apparatus and with an angle of orientation of 60° to the lengthwise dimension. By comparison, this film has a width which is about 2.4 times the width of a band spirally cut from the original length-oriented tube at an angle of 60° so as to obtain a band with orientation at an angle of 60° to the band length. This width advantage is gained both by a lateral stretching and by a shift in the direction of orientation which permits a lower angle of spiral cutting.

Two plies of the film thus obtained are united with a center length-oriented band in a 3-ply laminate, the plies being joined with pressure-sensitive adhesive. A tough, tear-resistant plastic sheet is thus provided.

To the end of demonstrating a specific technical need for the present invention the latter has in the foregoing been described with special reference to the production of cross-plastic. It is, however, to be understood that the devices described can be used for other objects of stretching, and hence the invention is not limited to the production of cross-plastic. As will be apparent to those skilled in the art, various modifications can be made in this invention without departing from the spirit or scope thereof.

I claim:

1. A method of stretching an elongated sheet of plastic film which comprises gripping said sheet transversely in a plurality of closely spaced parallel zones which form an angle substantially below 90° to the lengthwise dimension of said sheet, moving said sheet forward lengthwise under tension while maintaining said gripping, gradually shifting said gripping zones axially while maintaining them parallel so as to change the direction of movement of said zones and sheet and increase the angle which said zones form with the length of said sheet, and then releasing said sheet from said gripping.

2. The method of claim 1 wherein said plastic film is high density polyethylene.

3. The method of claim 1 wherein said plastic film is polypropylene.

4. A method of stretching an elongated sheet of plastic film which comprises advancing said sheet lengthwise under tension at about room temperature, continuously gripping said sheet between two sets of holding means having a plurality of rod-like members disposed transversally to said sheet and parallel to each other, said members forming an initial angle at engagement substantially below 90° to the direction of advancement, moving said film and members forward uniformly while shifting said members axially so as to change the direction of advance and increase the angle between said members and said direction, and separating said sets of holding means to release said sheet.

5. The method of claim 4 wherein said initial angle is about 45° and the final angle about 90°.

6. The method of claim 4 wherein said sheet is obliquely-oriented initially, the angle of orientation being increased by the process.

7. Apparatus for stretching plastic sheet material transversely comprising two gripping means each having a plurality of rod-like members disposed parallel to each other, means for moving said members of each gripping means in engagement with the members of the other gripping means, means for holding said members in parallel and closely spaced relationship while advancing same initially in a direction which is substantially less than 90° to the axes of said members, means for shifting said members axially so as to change continuously their resultant direction of advancement and increase the angle between said axes and the direction of advance, and means for separating the members of each gripping means from engagement.

8. The apparatus of claim 7 wherein said means for shifting said rod-like members comprises two sets of curved guide tracks engaging the ends of said members.

9. The apparatus of claim 7 wherein said means for holding said rod-like members parallel comprises a plurality of rotatable screws having helical grooves which engage said members, said screws being equally distributed over the area of engagement of said gripping means.

10. The apparatus of claim 9 wherein said screws are disposed so as to increase slightly the extent of engagement between the members of each gripping means as said members advance.

References Cited

UNITED STATES PATENTS

| | | | |
|---|---|---|---|
| 2,501,584 | 3/1950 | Schanz | 264—210 X |
| 2,943,356 | 7/1960 | Rasmussen | 264—290 X |

FOREIGN PATENTS

| | | |
|---|---|---|
| 1,259,120 | 3/1961 | France. |
| 559,541 | 1957 | Italy. |

ALEXANDER H. BRODMERKEL, *Primary Examiner.*

J. H. WOO, *Assistant Examiner.*